United States Patent [19]

Miller

[11] Patent Number: 5,235,702
[45] Date of Patent: Aug. 10, 1993

[54] AUTOMATED POSTING OF MEDICAL INSURANCE CLAIMS

[76] Inventor: Brent G. Miller, 2514 Edgebrook, Toledo, Ohio 43613

[21] Appl. No.: 507,401

[22] Filed: Apr. 11, 1990

[51] Int. Cl.⁵ .......................................... G06F 15/21
[52] U.S. Cl. .................... 395/600; 364/DIG. 2; 364/932.62; 364/974; 364/939.2; 364/401
[58] Field of Search .......................... 371/31; 382/57; 358/405; 395/575, 600, 650; 364/401, 406, 408, 200 MS File, 900 MS File

[56] References Cited

U.S. PATENT DOCUMENTS

| | | |
|---|---|---|
| 4,370,649 | 1/1983 | Fverle . |
| 4,491,725 | 1/1985 | Pritchard ............................ 364/413 |
| 4,553,206 | 11/1985 | Smutek et al. . |
| 4,639,920 | 1/1987 | Kaneko ................................. 371/31 |
| 4,648,037 | 3/1987 | Valentino . |
| 4,667,292 | 5/1987 | Mohlenbrock et al. . |
| 4,858,121 | 8/1989 | Barber et al. . |
| 4,933,979 | 6/1990 | Suzuki et al. ...................... 382/57 X |
| 4,974,260 | 11/1990 | Rudak ................................. 382/57 |
| 5,025,483 | 6/1991 | Dinan et al. ...................... 382/57 X |

*Primary Examiner*—Thomas M. Heckler
*Attorney, Agent, or Firm*—Joseph W. Berenato, III

[57] ABSTRACT

A method for inputting into a computerized data base system data disposed in a known format and comprising machine generated text is disclosed. The method comprises the steps of providing a document of known format; inputting the document into a computer system and converting the document into computer readable characters without manual typing of each characters; reconstructing within the computer the converted text which does not conform to the known format; flagging converted text which does not conform to the known format and which cannot be reconstructed; manually correcting the flagged text; and inputting the converted document to a computerized data base system.

30 Claims, 16 Drawing Sheets

SUMMARY NOTICE

| PATIENT | HIC | SERVICES BY | SERVICE DATES FROM TO | | PLACE | PROC CODE | NBR SVC |
|---|---|---|---|---|---|---|---|
| JONES<br>ICN 01111111110 | 000-22-3333 | 0111111 | 120389 | 021590 | 8 1 | 90360<br>MIN | 1.0 |
| A JONES<br>ICN 01111111111 | 111-22-3333 | 0111111 | 112089<br>112089<br>112089<br>112089 | 112089<br>112089<br>112089<br>112089 | 3 5<br>3 5<br>3 5<br>3 5 | 82645<br>84478<br>83720<br>83718<br>MIN | 1.0<br>1.0<br>1.0<br>1.0 |
| B JONES<br>ICN 01111111112 | 222-22-3333 | 0111111 | 111689<br>111689<br>111689 | 111689<br>111689<br>111689 | 3 5<br>3 5<br>3 5 | 83036<br>83735<br>80004<br>MIN | 1.0<br>1.0<br>1.0 |
| C JONES<br>ICN 01111111113 | 333-22-3333 | 0111111 | 112189<br>112189<br>112189<br>112189 | 112189<br>112189<br>112189<br>112189 | 3 1<br>3 5<br>3 5<br>3 5 | 90050<br>36415<br>85022<br>85580<br>MIN | 1.0<br>1.0<br>1.0<br>1.0 |
| D JONES<br>ICN 01111111114 | 444-22-3333 | 0111111 | 112189<br>112189<br>112189<br>112189 | 112189<br>112189<br>112189<br>112189 | 3 1<br>3 5<br>3 5<br>3 5 | 90050<br>36415<br>85022<br>85580<br>MIN | 1.0<br>1.0<br>1.0<br>1.0<br>THE |
| Z JONES<br>ICN 01111111119 | 999-22-333 | 0111111 | 112189<br>112189<br>112189<br>112189 | 112189<br>112189<br>112189<br>112189 | 3 1<br>3 5<br>3 5<br>3 5 | 90050<br>36415<br>85022<br>85580<br>MIN | 1.0<br>1.0<br>1.0<br>1.0 |

OF MEDICARE BENEFITS

| BILLED AMOUNT | ALLOWED AMOUNT | REMARKS | DEDUCT | CO-INSUR | PATIENT PAID | PAYMENT |
|---|---|---|---|---|---|---|
| 55.00 | 42.60 | 478 | | | | |
| 55.00 | 42.60 | 822 | .00 | 8.52 | .00 | 33.37 |
| 15.00 | 6.23 | 935 | | | | |
| 17.00 | 8.87 | 935 | | 12 | | |
| 25.00 | 20.50 | 935 | | | | |
| 25.00 | 13.04 | 935 | | | | |
| 82.00 | 48.64 | 822 | .00 | .00 | .00 | 47.62 |
| 30.00 | 15.07 | 935 | | | | |
| 15.00 | 6.79 | 935 | | | | |
| 52.00 | 5.32 | 935 | | | | |
| 97.00 | 27.18 | 822 | .00 | .00 | .00 | 26.61 |
| 30.00 | 28.00 | 477 | | | | |
| 5.00 | 3.00 | 935 | | | | |
| 27.00 | 8.74 | 935 | | | | |
| 8.00 | 6.14 | 935 | | | | |
| 70.00 | 45.88 | | .00 | 5.60 | .00 | 39.44 |
| 30.00 | 28.00 | 477 | | | | |
| 5.00 | 3.00 | 935 | | | | |
| 27.00 | 8.74 | 935 | | | | |
| 8.00 | 6.14 | 935 | | | | |
| 70.00 | 45.88 | 835 | .00 | 5.60 | .00 | 39.44 |
| AMOUNT OF | INTEREST | PAID ON | THIS | CLAIM IS | .06 | |
| 30.00 | 28.00 | 477 | | | | |
| 5.00 | 3.00 | 935 | | | | |
| 27.00 | 8.74 | 935 | | | | |
| 8.00 | 6.14 | 935 | | | | |
| 70.00 | 45.88 | 835 | .00 | 5.60 | .00 | 39.44 |

PAGE TOTAL  CUMULATIVE TOTAL  879.45

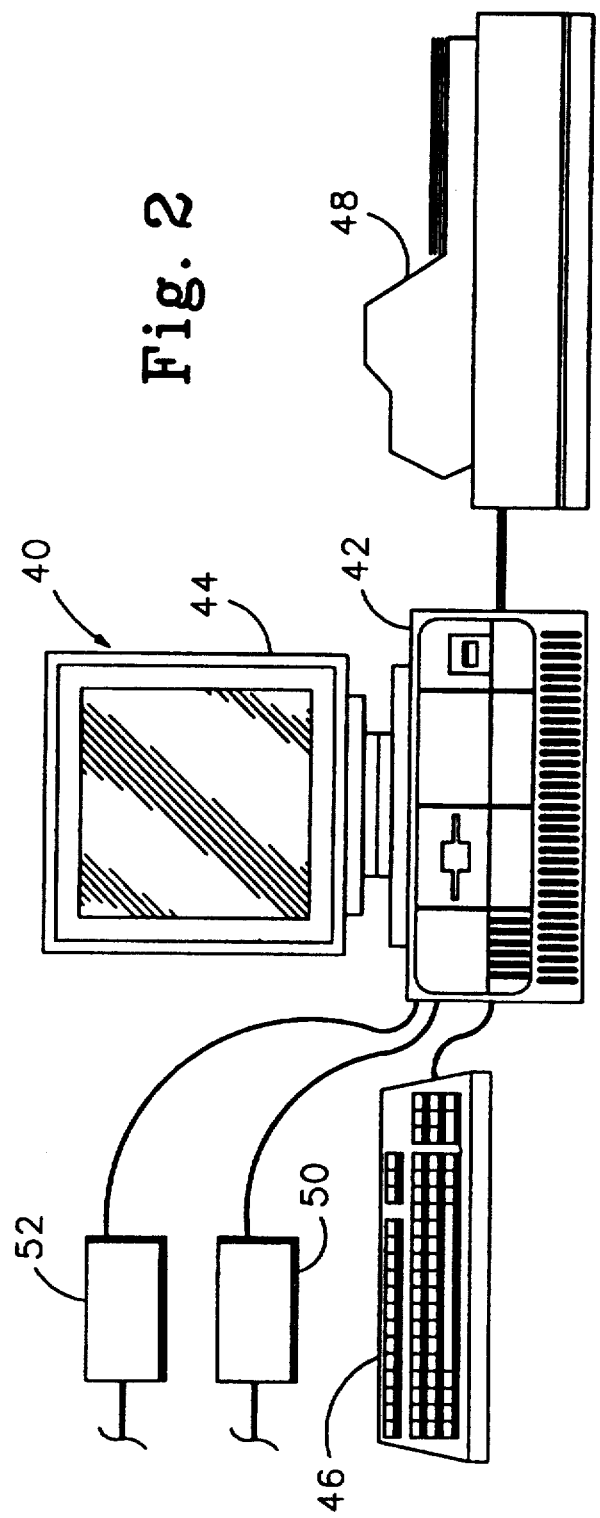

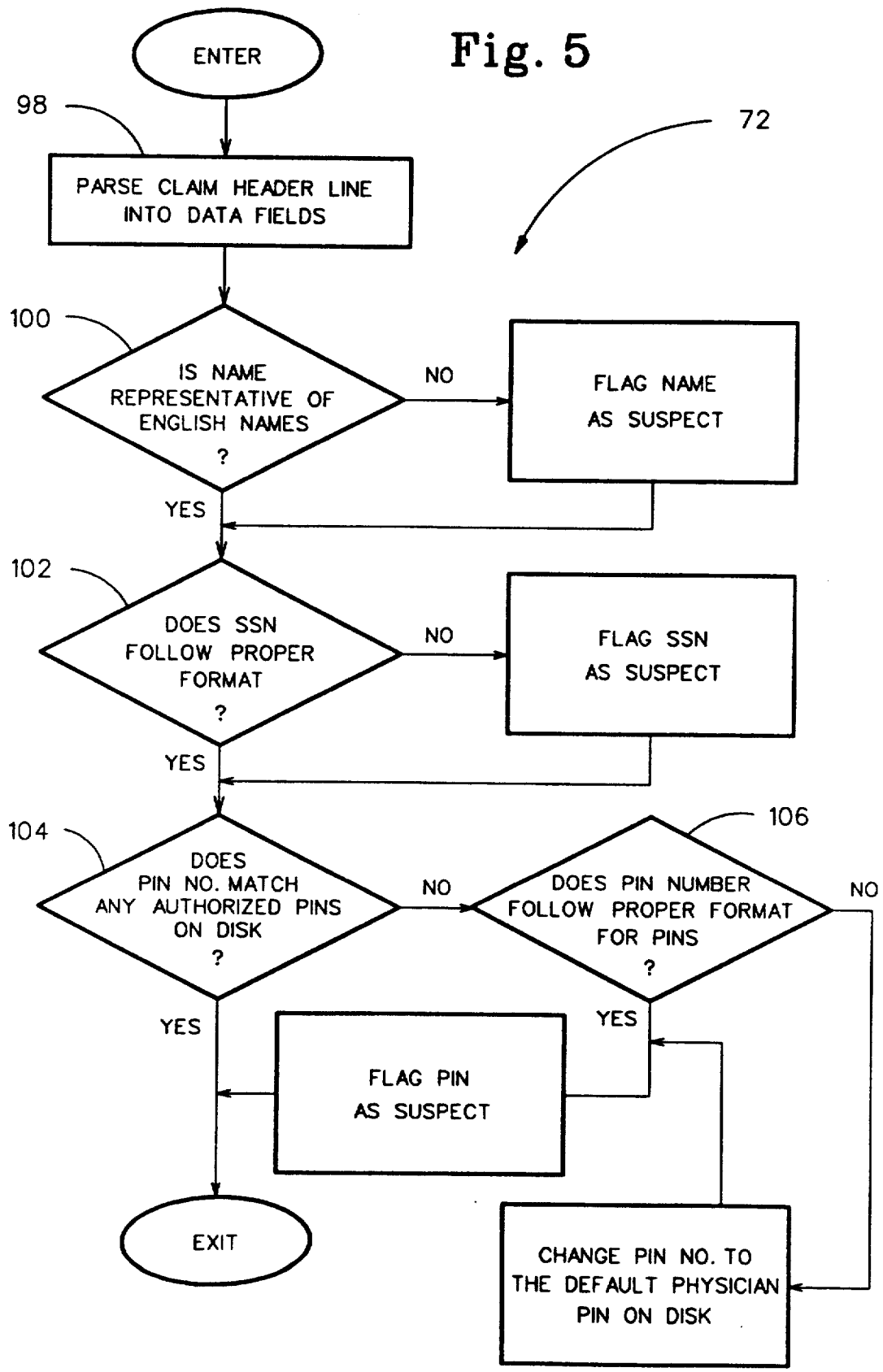

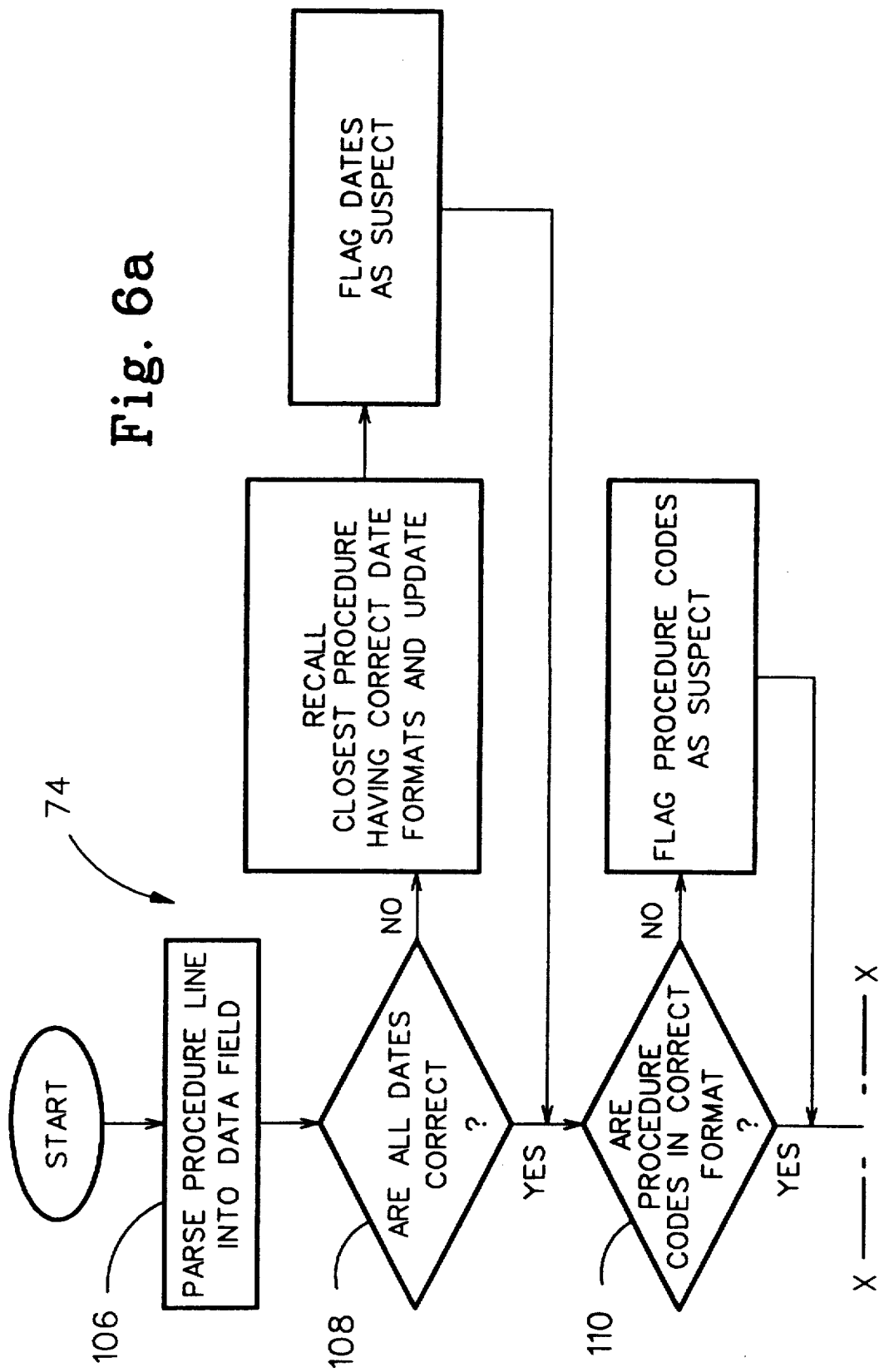

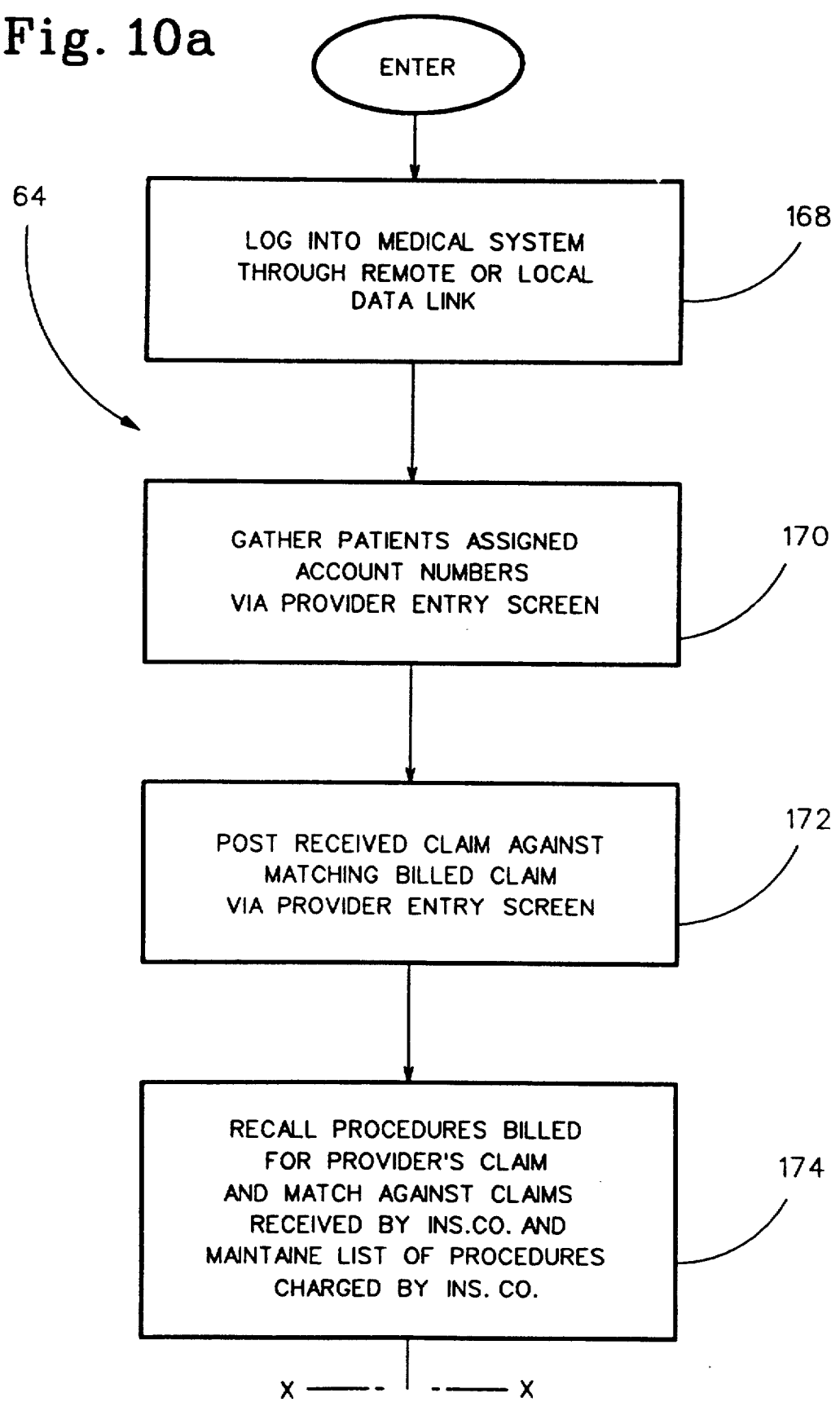

AUTOMATED POSTING OF MEDICAL INSURANCE CLAIMS

FIELD OF THE INVENTION

The present invention relates generally to automated data processing, and more particularly to automated posting of medical insurance claims.

BACKGROUND OF THE INVENTION

All medical institutions, regardless of size and areas of expertise, prepare, send, receive, and post medical insurance claims. This process over the past few years has become so complex with changing laws and regulations that, in order to efficiently run a medical practice or institution, it has become necessary to computerize records and the billing process.

Nearly all medical practices, hospitals, clinics, and other medical institutions that have computerized their patient records have available to them, through the vendor that supplied their medical software system, an Electronics Claims Submission system to submit their medical claims to various insurance companies, such as Medicare and Blue Cross Blue Shield. The method of submission of insurance claims is either by transmitting the claim over the telephone line via a modem, or by placing the insurance claim on a magnetic tape and either mailing or delivering the tape to the insurance company. The above practices are now widespread in submitting claims.

Regardless of the method of claim submission, after the claim has been processed by the insurance company, the insurance company in nearly all cases prints its determination of the claim and mails it back to the medical provider. At this point, it is then necessary for the provider's staff to manually enter into their records the claim determination shown on the returned claim form, using their knowledge of claim interpretation and how their particular medical system processes claims. This final step is costly, prone to human error, and time consuming.

The only exception to this method of claim return is the transfer of claim determination via a telephone line data link or tape to tape transfer. These methods are highly costly and require highly specialized software to operate and are not affordable by most practices, clinics, or hospitals.

To date, there are two experimental methods for automated claim posting of insurance forms that are available to an extremely limited number of medical offices and institutions scattered in various states from two insurance companies. In the first method, the insurance company will post its determination of the insurance claim directly to the provider's medical system over the telephone line via a modem. In this method, the medical institution must have absolute faith that the insurance company will post the proper amount and pay the proper amount. They must also give up all control of their medical system and remove all security from their medical system to accommodate the insurance company. The medical office or institution must also be running only the specific medical software package that the insurance company's software can talk to. These disadvantages make this system not workable.

In the second method, the insurance company will transfer its determination onto a magnetic tape to be loaded into the provider's medical system directly. It suffers again from lack of control over the data being entered, lack of security over the medical system, requires a specific medical package to be used by the medical office or institutions, and entails excessive cost.

Consequently, because these are the only available methods to any medical office or institutions for an electronic claims reception, a substantial number use the manual keyboard entry method.

Most medical offices, clinics and hospitals have a computer system interconnected with either a single terminal or a plurality of local and/or remote terminals. These medical offices, clinics and hospitals already have purchased and are using one of several dozen medical software systems on their computer to maintain patient records, billing, accounting, etc. Because of their already committed assets and training in their medical hardware and software systems, they are mostly unwilling to accept systems such as the ones outlined by Pritchard (U.S. Pat. No 4,491,725) and Barber (U.S. Pat. No. 4,858,121) which, when operated most efficiently, provide nearly instant transmission and reception of claims after being processed by the insurance carrier, over the telephone line. They are unwilling to accept systems that require that they discard all their hardware and software systems previously purchased and in use.

Many medical offices, clinics, and hospitals have a computerized medical system which stores patient data, processes insurance claims and maintains charts and business accounting records. Of these tasks, insurance claim processing is the most difficult and complex for any system. There are presently hundreds of such medical systems in use and available. Each medical system performs basically the same functions but with a different hardware and software implementation. In practice, it is therefore difficult, and impossible in many cases, to transfer data from one medical system to another. It is generally impossible to obtain an add-on function to an existing medical system unless it was specifically written by the particular medical system manufacturer.

Since the most complex task is in the processing of insurance claims, many of these medical system manufacturers have developed and made available to their system purchasers an add-on to electronically transmit, via telephone lines, insurance claims to the two largest claim carriers, namely Medicare and Blue Cross Blue Shield. Claim submission to any of the hundreds of other insurance companies is handled by printing the claim and mailing it to the appropriate insurance carrier. This add-on package, however, does not provide the electronic reception by the medical center of the processed claim from the insurance company. The processed claim is still received by the medical center through the mail in paper form and posted manually.

OBJECTS AND SUMMARY OF THE INVENTION

It is therefore an object of the present invention to provide a system for the automated posting of medical insurance claims that is cost effective, does not violate the security of any medical computer system, works with all medical and insurance carriers' computer system, and is exceptionally fast and accurate.

It is another object of the present invention to provide a system for the automated posting of medical insurance claims that is based on the use of scanner and optical character recognition technology combined with software in accordance with the present invention that automatically interprets and corrects for scanner and OCR imperfections and abnormalities, verifies suspect configurations, and posts the received, scanned, and converted claims directly to the providing medical computer system via its entry screens.

It is still another object of the present invention to provide a system for the automated posting of medical insurance claims that minimizes the manual entry of the returned insurance claims into the provider's medical system. The complexity involved with the entering of processed claims into the provider's medical system requires time, generates mistakes, and generally requires at least a full time person to handle the operation alone. As a result, not only is the cost of the inherent delay saved, but accuracy and speed of claim posting processing are greatly increased.

It is yet another object of the present invention to provide a system for the automated process of posting to any computer system any document having machine generated or printed text, thereby eliminating the cost in terms of time and lack of accuracy inherent in manual posting.

These and other objects of the present invention will become apparent from the following detailed description.

BRIEF DESCRIPTION OF THE DRAWINGS

FIGS. 1a and 1b when combined, are a typical example of a summary notice of a medical benefits claim after being processed by an insurance company.

FIG. 2 is a typical personal computer system that uses the present invention.

FIG. 5 is a flowchart depicting in greater detail an algorithm of FIG. 4 according to the present invention for checking the claim header of the summary sheet of FIG. 1.

FIGS. 6a and 6b, when combined, are a flowchart depicting in greater detail an algorithm of FIG. 4 according to the present invention for checking the procedure line of the summary sheet of FIG. 1.

FIGS. 10a and 10b are flowcharts of a posting program module according to the present invention for automatically posting the processed and corrected data of the summary sheet of FIG. 1 into a provider's medical system.

DETAILED DESCRIPTION OF THE INVENTION

FIGS. 1a and 1b

Figure 3:
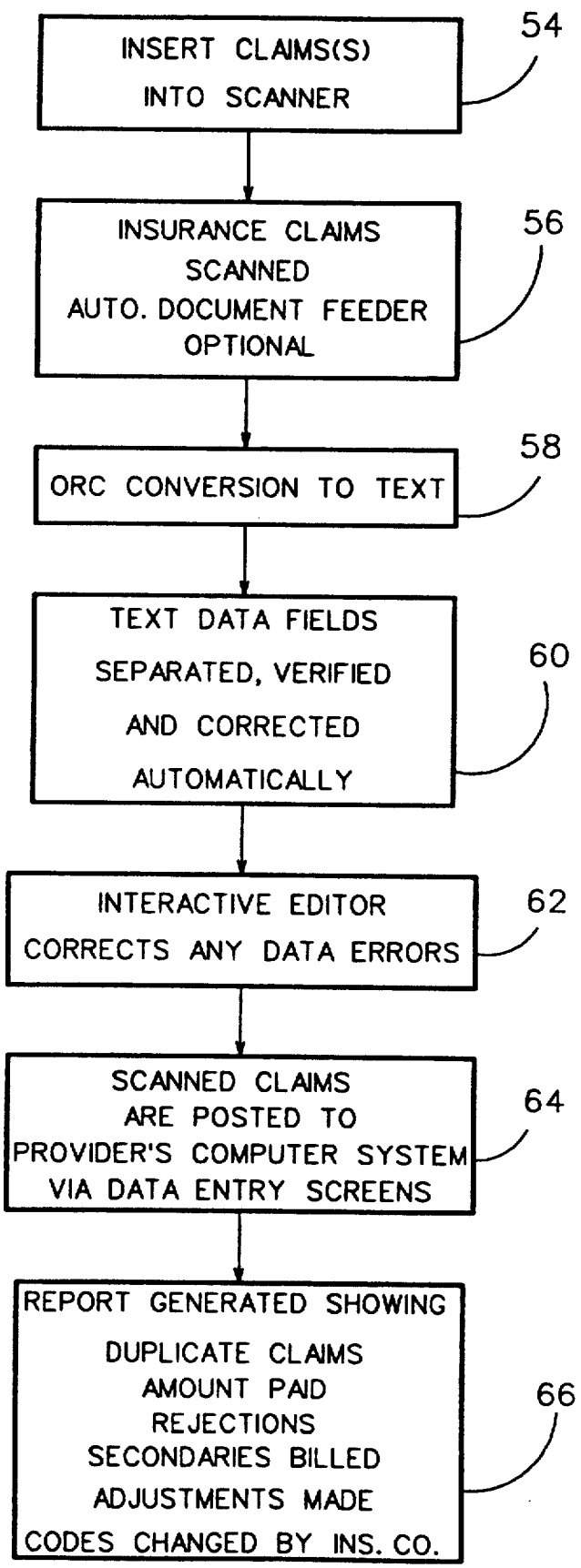
FIG. 3 is a flowchart depicting the overall process for automated posting of medical insurance claims according to the present invention.

The embodiment of the present invention will be described using a Medicare claim document R, as best shown in FIGS. 1a and 1b. The document R has printed data thereon arranged in a plurality of rows 2 and columns or fields 4. The first three columns or fields contain the patient's name 6, his or her social security number 8 and the identification number of the provider 10, respectively, and are collectively designated as header claim 11. The patient's name is always indicated by one alpha character representing the first initial of the patient's name, followed by a string of up to eleven alpha characters representing the patient's last name. No non-alpha characters are allowed in the field 6. The social security number field 8 has a format of three digits, followed by a hyphen, followed by two digits, followed by a hyphen and followed by four digits. The field 8 can also be a string of characters comprising an alpha character, followed by two digits, followed by a hyphen and followed by five digits. The field 10 includes the provider's information number (PIN) which is assigned by Medicare. The PIN number is a seven digit number which identifies the doctor performing the services on a patient.

The next 7 columns are collectively referred to as the procedure line 12 and indicates the service dates, place, procedure code, service units, billed amount, amount allowed and remarks, respectively. The service date field 14 includes a "from" date and a "to" date. The dates are a six digit number where the first two digits represent the month, the next two digits represent the day and the last two digits represent the year. The "from" date is always equal to or less than the "to" date. The place field 16 is a two digit field and indicates the location where the services were rendered by a provider. The procedure code field 18 is a five digit number or a string of characters comprising an alpha character followed by a four digit number. The procedure codes are assigned by the American Medical Association and are known in the industry as Current Procedural Terminology (CPT). The service units field 20 is a two digit number including a string of digits, followed by a decimal point and then followed by one digit. The billed amount field 22 and the allowed amount field 24 are dollar figures which are in a format of a string of digits, followed by a decimal point and then followed by two digits. The format may also include a decimal point followed by two digits. Also, the fields 24 and 26 may also include commas as a thousands separator. The remarks field 26 is in the form of a 2 or 3 digit number. The procedure line 12 can only have one remarks field.

A claim summary line 27 is disposed in a separate row from the procedure line and includes the total of the procedure billed amounts field 22, the total of allowed amounts field 24, remarks field 26, deduction amount 28, co-insurance amount 30, patient payment amount 32, and payment amount 34. Except for the remarks field 26, all of the fields in the claimed summary line 27 are dollar figures which are in the format of a string of digits, followed by a decimal point and then followed by two digits. The remarks field 26 in the claim summary line 27 is a two or three digit number. The claim summary line can have two remarks numbers.

An interest payment line 36 is disposed below the summary line 27 and indicates the amount of interest paid by Medicare on a particular patient's claim. The interest payment line 36 is in the format of a string of alpha characters followed by a dollar amount in the form of a string of digits, followed by a decimal point and then followed by two digits.

A claim group 38 includes a claim header 11 that is associated with one or more procedure lines 12, a summary line 27 and an interest line 36.

Each page of document R includes a page total P, which represents the total of the payment made by Medicare for that page, and a cumulative total C, which represents the total for the current page and the preceding pages.

The document R also includes a header 40 which is a string of alpha characters with a number of space characters.

A person skilled in the art will understand that the present invention can be applied to any insurance claim form from a number of insurance companies, such as Blue Cross Blue Shield, Nationwide/Traveler's Insurance Company, Community Mutual, Metropolitan Life, Aetna, Bureau of Worker's Compensation, Medicare, etc. Also, the present invention can be applied to any document which has machine generated text or data, such as printed text, typewritten text, dot-matrix generated text, facsimile output text, etc.

The present invention comprises a micro-computer 40, such as a standard personal computer, including a CPU 42, a monitor 44, a keyboard 46, a scanner 48, a printer 50 and a modem 52. The micro-computer 40 utilizes a program according to the present invention that will be described in detail below.

FIG. 3

The program utilized in the present invention is depicted in an overview flowchart, as best shown in FIG. 3. The document R is first inserted into the scanner 48, as in step 54. The scanner then inputs the document into the computer 40 where it is converted into machine readable text, as in steps 56 and 58.

The output of the scanner includes numerous errors, on the order of one thousand errors per page of a typical Medicare claim, because of the developmental stage of the optical character recognition (OCR) technology.

The present invention preferably uses an HP Scanjet Plus (a Registered Trademark) OCR Scanner.

The scanner 48 converts the document to the closest interpretable representative characters, such as ASCII characters, by means of currently available OCR software and/or hardware. This conversion process is typically very crude, producing numerous conversion errors on a short 10-page Medicare claim document. The smaller the text, the greater the number of conversion errors. Because some claims contain text as small as 180 characters/line and 140 lines/page, approximately one thousand errors/claim per page is possible. These errors can include complete and partial omissions, additions, improper character conversions, garbled and broken text, numbers, and symbols, etc. The converted text is worthless without further enhancement. The result of the OCR conversion process is a file containing the best fit text conversions and errors.

The converted text as generated by the scanner is then automatically reconstructed using a reconstruction program module 60, which will be described below, to eliminate as many of the errors as possible from the conversion process. Any errors that cannot be automatically corrected are flagged and passed on to an interactive editor program module 62, which will be discussed below.

The interactive editor program module 62 interfaces with an operator who confirms or supplies new values to the flagged data. After the flagged errors have been corrected, the document R is now ready to be posted to the provider's medical system. A posting program module 64, which will be described below, automatically posts the data from the document R to the medical system through its entry screen, after which a report is generated on the printer 50, as in step 66.

Figure 4A:
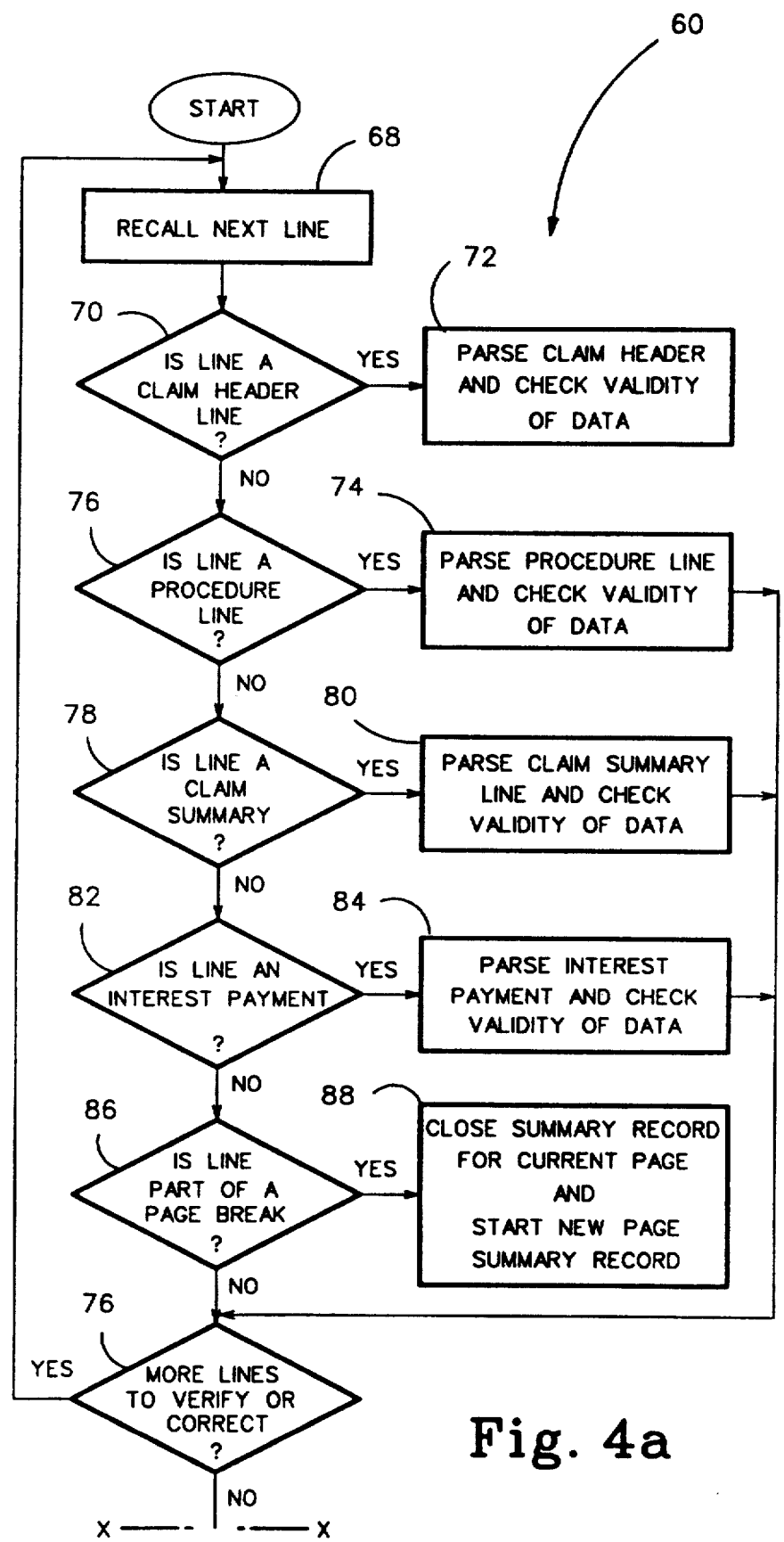
FIGS. 4a and 4b are flowcharts according to the present invention depicting in greater detail the reconstruction program module of FIG. 3 as applied to the summary notice of FIG. 1.
Figure 4B:
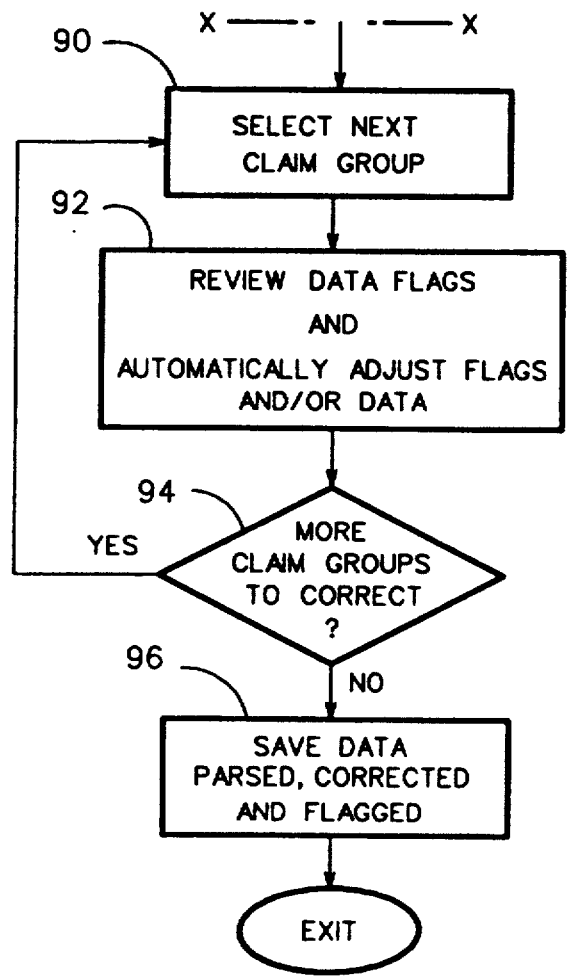

FIGS. 4a AND 4b

The reconstruction program module 60 is disclosed in an overview flowchart at FIGS. 4a and 4b. The converted file generated by the previous scanning steps is input into the reconstruction module program 60. An algorithm 68 detects the first line of the file. A line is characterized by a terminating character, such as a new line code or an end of line code. An algorithm 70 then determines if the line just detected is a claim header line 11. The algorithm 70 determines that it is a claimer header line if it contains the patient's name field 6, the patient's social security number field 8 and the pin number field 10. These fields are in specific formats which are recognizable by the algorithm which determines whether it is a claim header line. An algorithm 72 checks the validity of each of the fields in the claim header line in a series of steps which will be described below. Since the first claim header line is always followed by a procedure line, an algorithm 74 next checks the validity of data in the procedure line. The algorithm 74 will be described in detail below.

At the end of the algorithm 74, an algorithm 76 then determines if there are more lines to verify or correct. If there are more lines to correct, then the program goes back to algorithm 68 to recall the next line. Since a claim header line and a procedure line have just been corrected, the program then moves to algorithm 76. If the claim group 38 includes several procedure lines, then the second procedure line from the claim header line is then checked for validity of data by algorithm 74. The program then moves again to algorithm 76 to determine if there are more lines to verify or correct. If there are more lines to correct, then it loops back to algorithm 68 which recalls the next line.

When all of the procedure lines have been checked, the program now moves to algorithm 78 which determines if the next line is a claim summary line. The algorithm 78 looks for a string of characters comprising a dollar figure for the sum of the billed amounts in the claim group, followed by another dollar figure for the sum of the allowed amounts in the claim group, followed by a three digit number for the remarks, followed by four dollar figures for the deduction amount, coinsurance amount, the patient payment amount and the payment amount received, respectively. If the algorithm 78 determines that the line is a claim summary line, then the data in the claim summary line are checked for validity by algorithm 80, which will be described below.

The program then goes to algorithm 76 to determine if there are more lines to verify or correct, and then returns to algorithm 68 to recall the next line if there are more lines to verify or correct. The program then goes to algorithm 82, since the program has just checked a claim header line, one or more procedure lines, and a claim summary line. The algorithm 82 looks for a string of text followed by a dollar amount. If the line is an interest payment line, then the dollar figure in that line is checked for validity by algorithm 84, which will be described below, and the program then goes to algorithm 76.

If there are more lines to correct, then the program loops back to algorithm 68 to recall the next line, and assuming that the interest payment line is the last line on the document R, then an algorithm 82 looks for the header line 40 or other characters which may be disposed at the bottom of each page of the document R which would signify that it is the end of the page. If the algorithm 82 finds a page break, then an algorithm 88 increments a page counter, provides a page location for all information contained on that page that has just been corrected, and starts a new page. Algorithm 88 creates a table of pages indicating where each claim starts and ends in memory. The entire process described above is then repeated for the next page and succeeding pages.

When all of the pages in the document R have been checked and suspect data flagged, then an algorithm 90 selects the first claim group on the first page. The data flags are then reviewed and automatically adjusted if appropriate by algorithm 92, which will be discussed in detail below. Other data are also adjusted, depending on operations made on suspect data. Next, an algorithm 94 determines if more claim groups are to be corrected. The program then goes to algorithm 90 to review the next claim group until all the claim groups in the document R have been reviewed by algorithm 92. Algorithm 96 then saves all the parsed, corrected and flagged data for input into the interactive editor module 62.

The reconstruction program module 60 is specific to each form type and layout that is being reconstructed. Thus, the reconstruction module will be different for each type of document that is being reconstructed. Because the programs are advantageously modularized, it would be relatively easy to write a reconstruction module that is specific to a particular format of a document without affecting the other portions of the overall program.

The reconstruction module provides the ability to reduce the number of conversion errors to a few number per claim. The particular format and layout requirements of the document being scanned can be changed to accommodate any or all of the hundreds of different insurance company forms by simply changing the reconstruction program module of the present invention.

FIG. 5

The algorithm 72 used to check the validity of data in a claim header line will now be described.

An algorithm 98 parses the claim header line into its component data fields, including the patient's name field 6, the patient's social security number field 8 and the provider's PIN number field 10. Parsing comprises the operation of separating a string of characters into fields by looking at "white" spaces such as nonprintable blank characters, tab characters, etc.

An algorithm 100 then looks at the patient name field 6 and determines if it is the proper format. The algorithm 100 looks for a first alpha character representing the first initial of the patient's name and looks for up to eleven characters which represents the patient's last name. This format is standard in a Medicare claim form. No non-alpha characters are permitted. If the algorithm 100 finds a non-alpha character, then the field is flagged as suspect for correction or verification in the interactive editor program module 62.

An algorithm 102 then looks at the social security number field 8, and determines if the number follows a proper format. The algorithm 102 looks for a three digit number, followed by a hyphen, followed by a two digit number, followed by a hyphen and then followed by a four digit number. It also looks for a letter of the alphabet, followed by a two digit number, followed by hyphen and then followed by a five digit number. If the algorithm 102 does not find either of these two formats, the number is flagged as suspect and passed on for correction to the interactive editor program module 62.

An algorithm 104 then looks at the next field which is the PIN number field 10 and determines if it matches any authorized PIN number stored on a disk. All of the PIN numbers of the doctors in the clinic are stored on the disk. The algorithm 104 determines whether the data is valid by comparing it with the list on the disk. If the PIN number does not make a match with any number on the disk, then an algorithm 106 determines if the PIN number follows the proper format for a PIN number. This means that the PIN number must be a seven digit number. If it doesn't follow this format, then the PIN number is changed to a PIN number of the doctor which provides most of the services in the clinic because the likelihood is high that this is the case. The PIN number, whether it follows the proper format or not, is then flagged a suspect for verification or correction in the interactive editor program module 62.

Figure 6B:
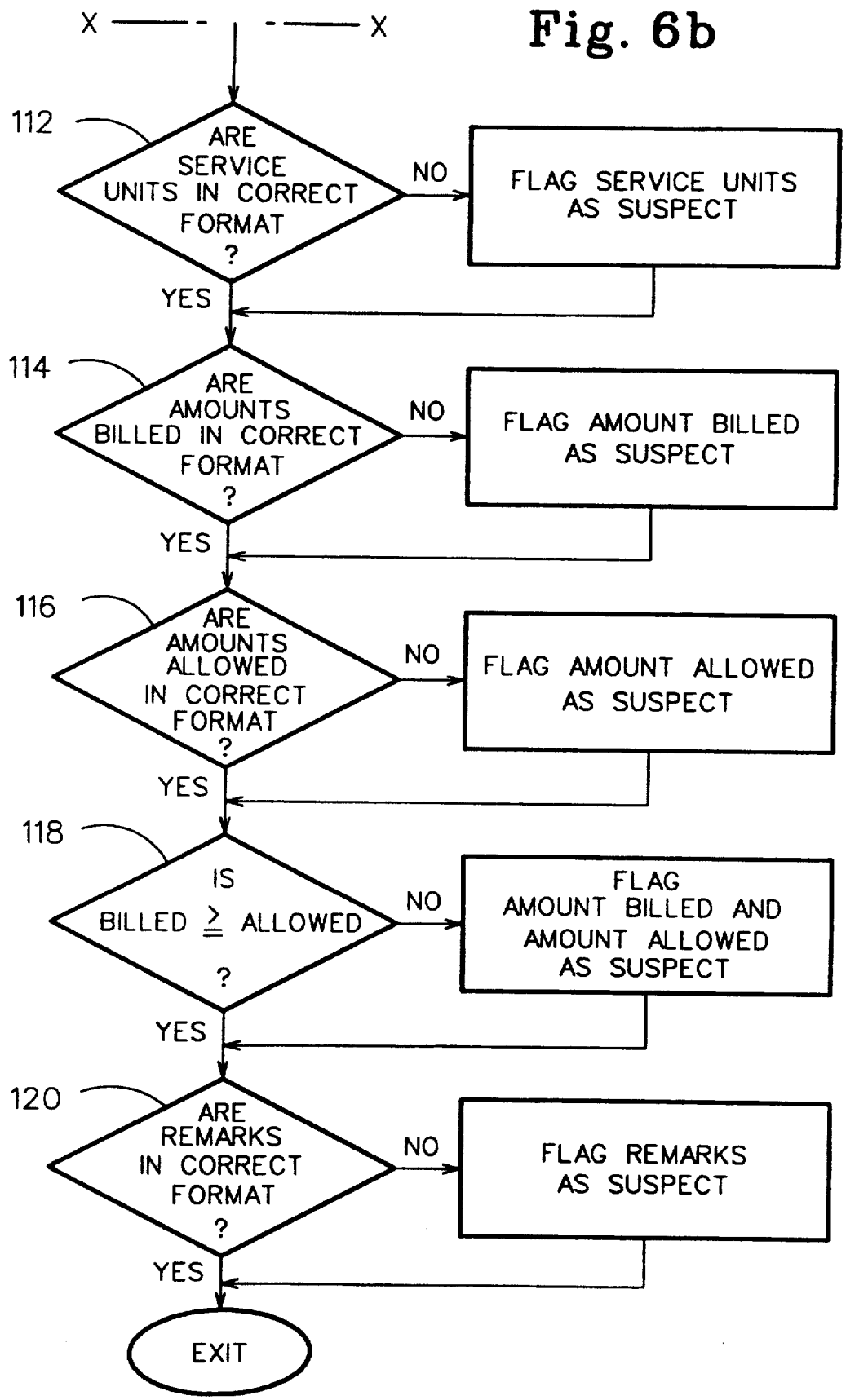

FIGS. 6a and 6b

The algorithm 74 for checking the validity of data in a procedure line will now be discussed with reference to FIGS. 6a and 6b.

An algorithm 106 parses the procedure line into its component data fields comprising the service date field 14, the procedure code field 18, the number of service field 20, the billed amount field 22, the allowed amount field 24, and the remarks field 26.

An algorithm 108 checks for the date field and determines whether the dates are in the correct format. The dates must be a six digit number where the first two digits must be from 1 through 12 to indicate the month, the second two digits must be from 1-31 to indicate the day, and the last two digits represent the year. In this particular application, the last two digits must be greater than 87. The algorithm 108 checks that, the date is real so that unless it is a leap year, a date indicating February 29 will be flagged as suspect. The date field 14 includes the "from" date to the "to" date. The algorithm 108 checks that the "to" date is equal to or greater than the "from" date. If a date is garbled, the algorithm 108 inserts a date so that keystrokes are saved when the date is edited in the interactive editor program module 62. Also, if the date is suspect, the algorithm 108 looks for a valid date from a procedure line that has already been validated and uses that date. However, the date is still flagged as suspect.

Algorithm 110 then checks the procedure code field 18 to determine whether it is in the correct format. A procedure code is always a five digit number or a string comprising an alpha character followed by a four digit number. A listing of procedure codes, called CPT codes, is developed and updated every year by the American Medical Association. The listing is stored on a disk. The algorithm 110 compares the procedure code with the list on the disk. If there is no match, the procedure code is flagged as suspect and is corrected manually in the interactive editor program module 62.

An algorithm 112 then checks for the service unit field 20 to determine whether it is in the correct format. The service unit data is a number having eight digits, followed by a decimal point and one digit. It can also be a decimal point followed by two digits. If the service unit data is not in the correct format, then it is flagged as suspect for correction by the interactive editor program module 62.

An algorithm 114 then checks whether the billed amount is in the correct format. The algorithm 114 looks for a string of digits followed by a decimal point and two digits. Commas are permitted as thousands separators. If the billed amount is not in the proper format, then it is flagged a suspect for further review by the algorithm 92 and for verification or correction by the editor program. If the billed amount does not include a decimal point, the algorithm 114 will insert a decimal point and flag the data.

An algorithm 116 then checks the allowed amount for correct format in the same fashion as algorithm 114. If the allowed amount is not in the correct format, then it is flagged for further review by the algorithm 92 and for verification and correction, if necessary, by the editor program.

An algorithm 118 then checks whether the billed amount is greater than or equal to the allowed amount. If the relationship is not satisfied, then the billed amount and the allowed amount are flagged as suspect. An algorithm 120 finally checks the remarks field 26 to determine whether it is in the correct format. The data in the remarks field must be a two or three digit number. For a procedure line, only one remarks number is allowed. However, for claim summary line, two remarks numbers are permitted. If the remarks data do not confirm to the correct format, then they are flagged as suspect for correction by the interactive editor program.

Figure 7A:
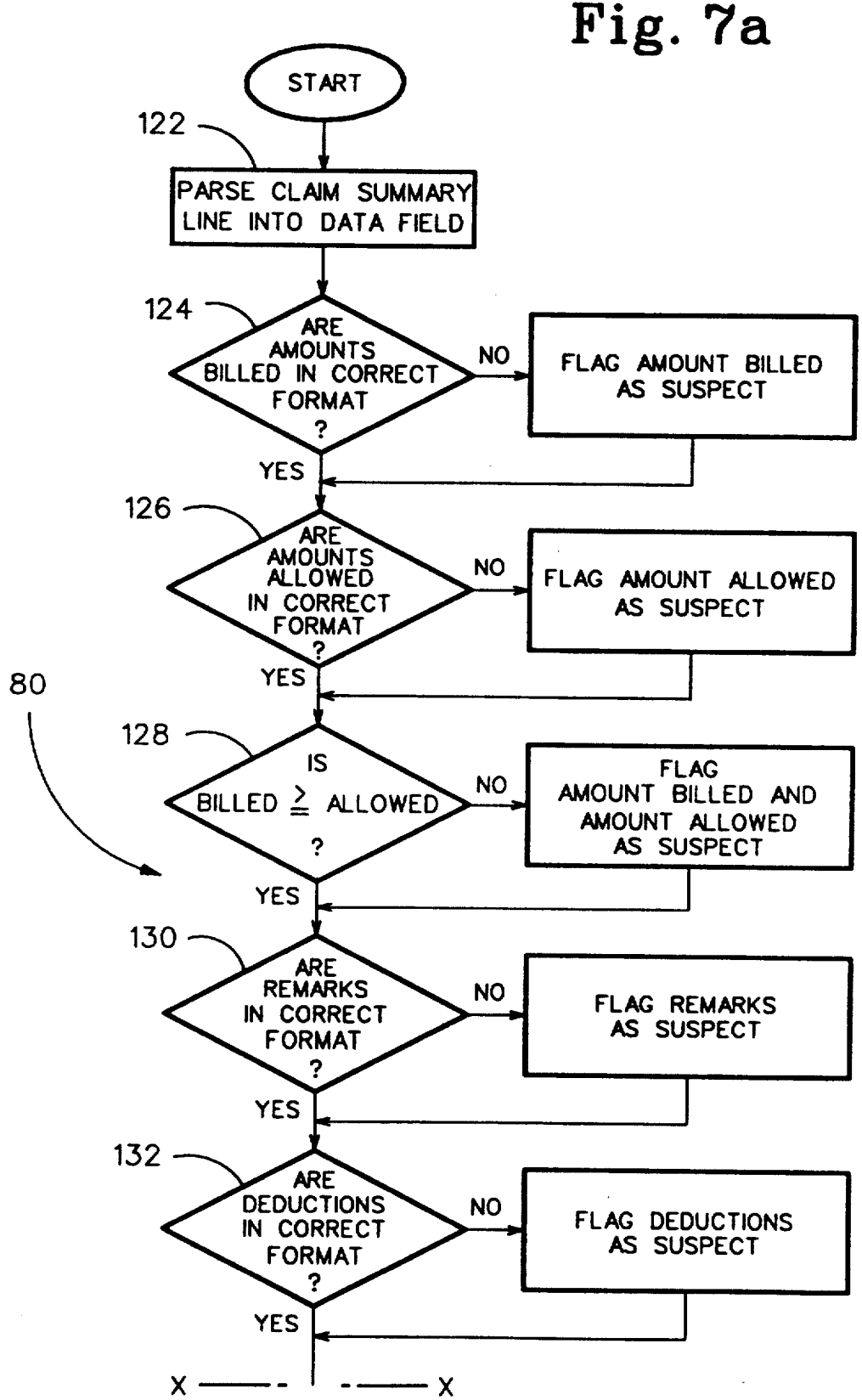
FIGS. 7a and 7b, when combined, are a flowchart depicting in greater detail an algorithm of FIG. 4 according to the present invention for checking the claim summary line of the summary sheet of FIG. 1.
Figure 7B:
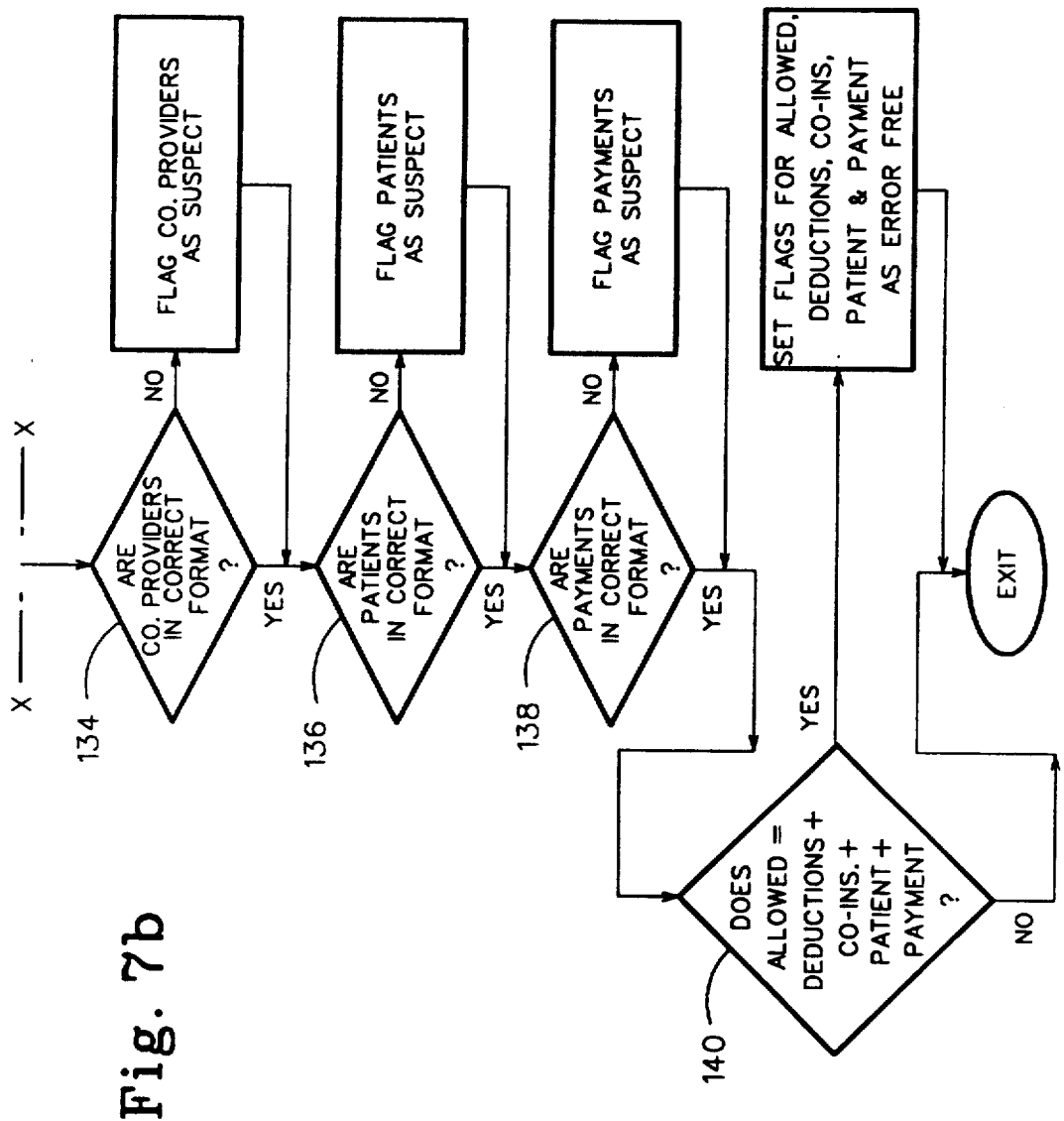

FIGS. 7a and 7b

The algorithm 80 for checking the validity of data for a claim summary line will now be discussed with reference to FIGS. 7a and 7b.

An algorithm 122 parses the claim summary line into its component data fields, including billed amount total for a claim group in the billed amount field 22, the allowed amount total for a claim group in the allowed amount field 24, the remarks field 26, the deduction amount field 28, the co-insurance amount field 30, the patient payment amount field 32 and the payment field 34.

Algorithm 124 checks the billed amount. It should be a dollar figure, which is a string of digits followed a decimal point and two digits. If it is not in the correct format, then the data is flagged for further review by the algorithm 92 and the interactive editor 62.

An algorithm 126 then checks for the allowed amount in the same manner as the algorithm 124, and flags the field if it does not fall in the correct format.

An algorithm 128 then checks whether the billed amount is greater than or equal to the allowed amount. If the relationship is not satisfied, then the billed amount and the allowed amount are flagged as suspect for further review by the algorithm 92 and the interactive editor.

An algorithm 130 then checks the remarks data to see if it is in the correct format. Remarks data is a two digit or three digit number, and for a claim summary line the remarks field can have one or two numbers.

The deduction amount field 28, the co-insurance amount field 30, the patient payment field 32 and the payment field 34 are all dollar figures in the format of a string of digits followed by a decimal point and two digits. Thus, algorithms 132, 134, 136 and 138 follow the same steps as in algorithm 124 and 126. If the data are not in the correct format, they are flagged as suspect for review by the algorithm 92 and for correction or verification by the editor program.

The dollar amounts in the claim summary line, whether found to be in the correct format or flagged as suspect, are then tested by algorithm 140 to determine whether they satisfy the following equation:

Allowed amount = deduction amount + co-insurance amount + patient payment amount + payment amount.

If the equation is satisfied, then any flags that were set for the allowed amount, deduction amount, co-insurance amount, patient amount or the payment amount are set as error free.

The flow chart for checking the validity of data in the interest payment line is not shown but is described as follows. An algorithm checks the interest payment amount to see if it is in the correct format. If it is, then the algorithm is exited. If it is not, then the interest payment amount is flagged as suspect for review by the algorithm 92 and for verification or correction by the interactive editor.

Figure 8A:
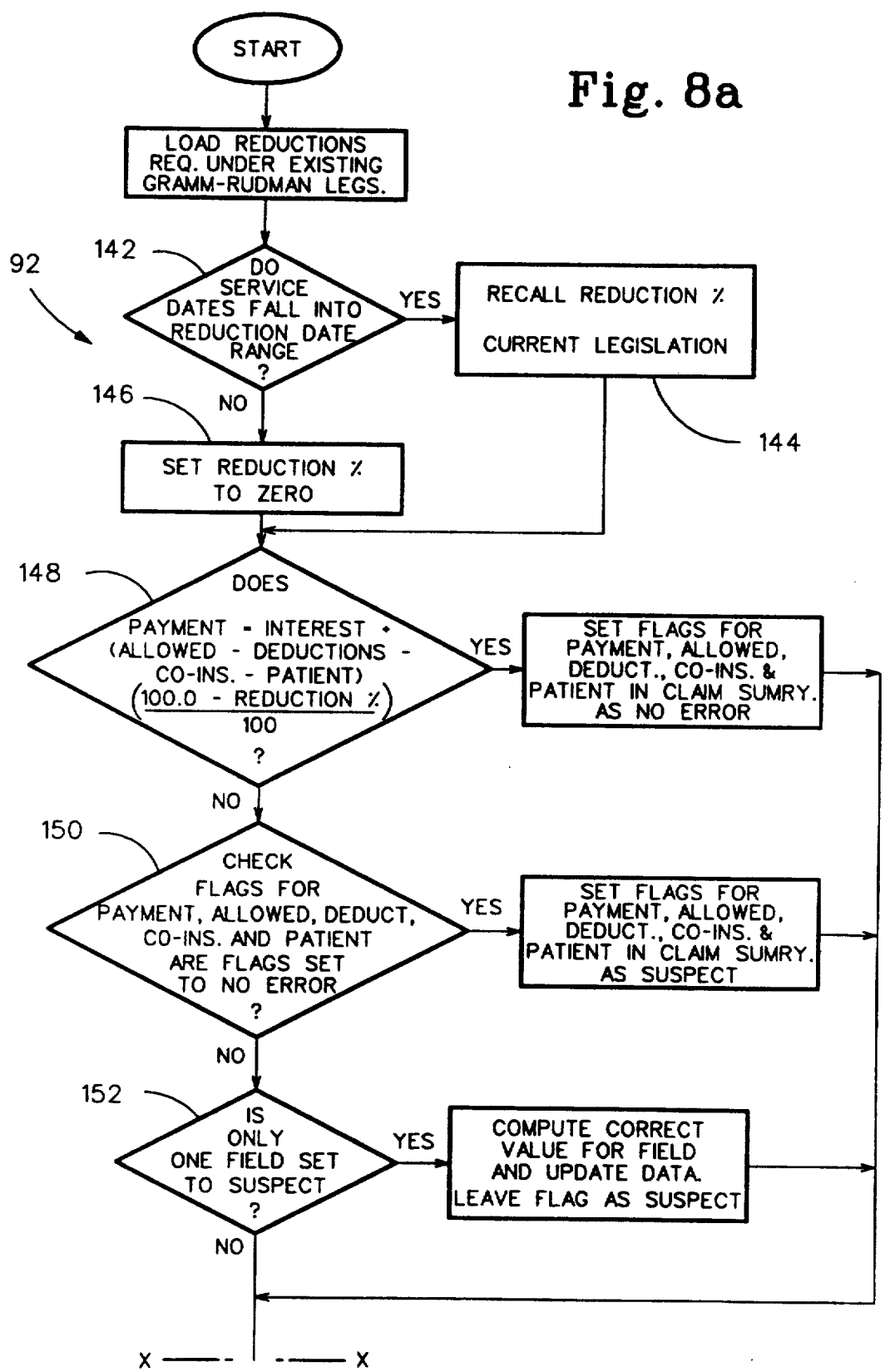
FIGS. 8a and 8b are flowcharts depicting in greater detail an algorithm according to the present invention for reviewing data after having been processed according to the flowcharts of FIGS. 5 through 7.
Figure 8B:
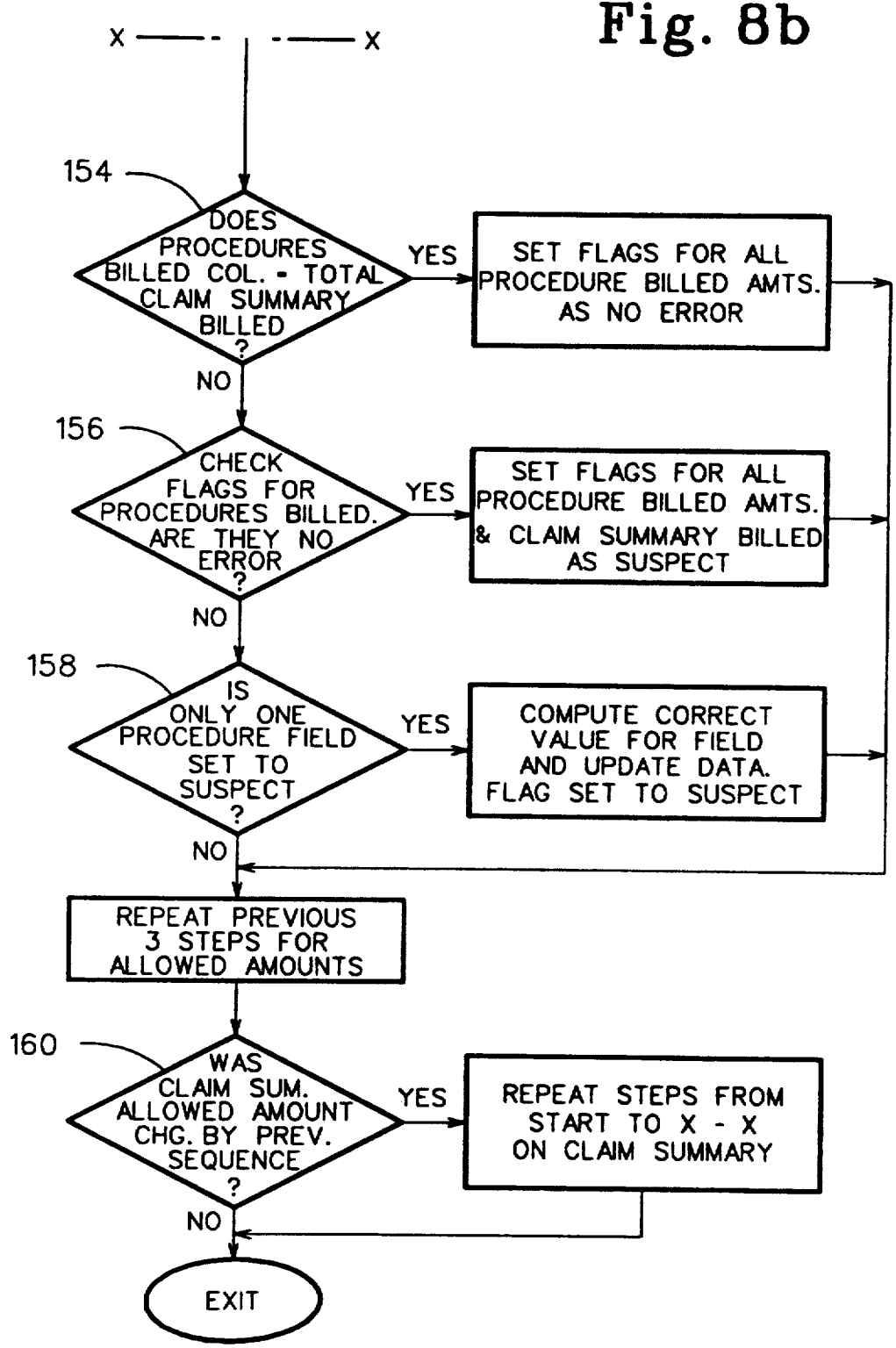
Figure 9:
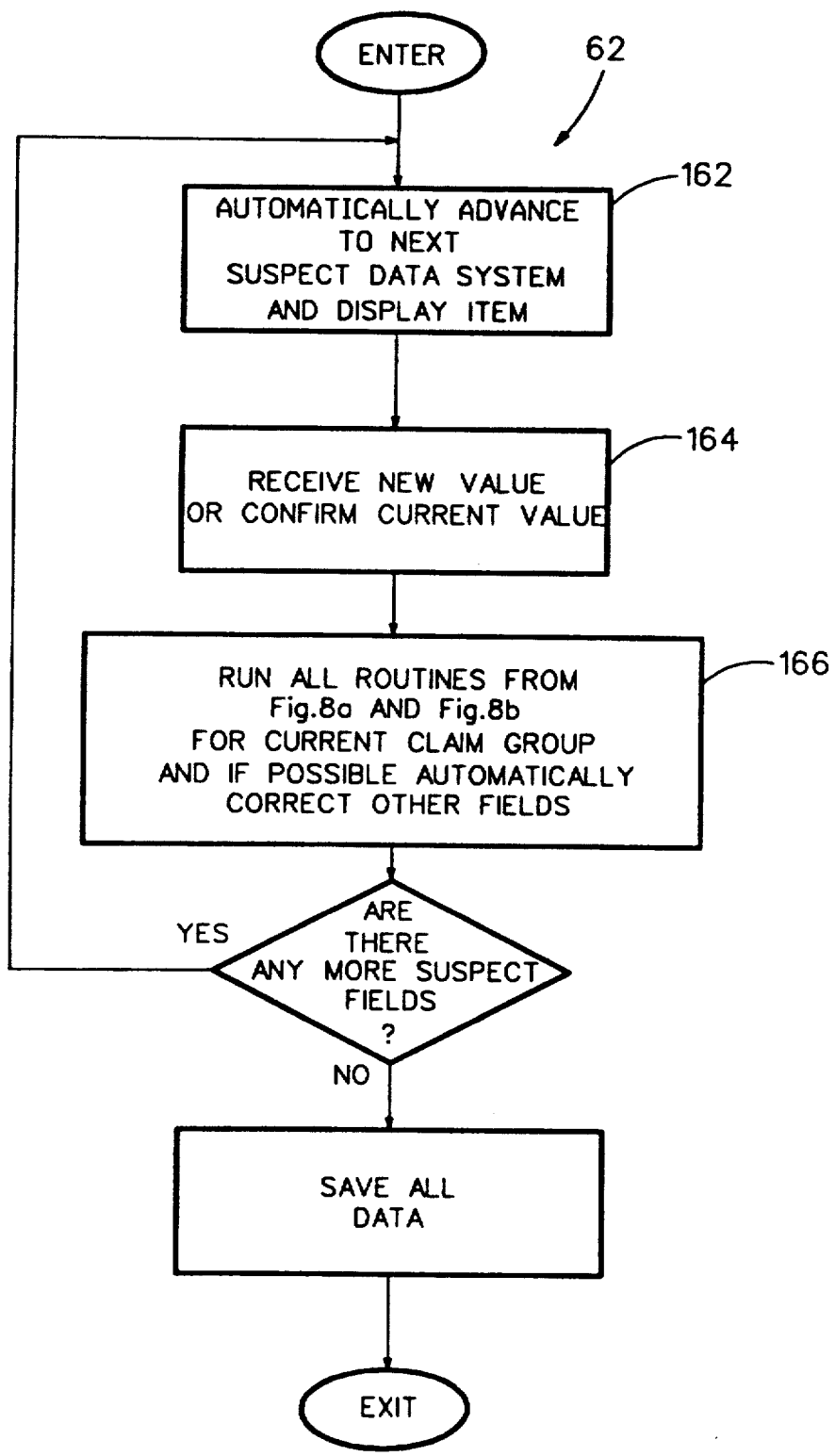
FIG. 9 is a flowchart of an interactive editor program module according to the present invention for confirming or providing new values to suspect data after they have been automatically reconstructed.

FIGS. 8a AND 8b

The algorithm 92 for reviewing data flags and automatically adjusting flags and/or data will now be described.

The reduction required under existing Gramm-Rudman legislation is loaded into the computer. An algorithm 142 then determines whether the service date on each procedure line fall within the reduction date range. A reduction percentage is then recalled in step 144 if the service dates fall within the reduction date range. If the service dates are outside the reduction date range, then step 146 sets the reduction percentage to zero.

An algorithm 148 then determines whether the data in a claim summary line satisfies the following equation:

Payment amount = interest amount + (allowed amount − deductions amount − co-insurance amount − patient payment amount) (100.0 − reduction percentage)/100.

If the equation is satisfied, then any flags for payment, allowed amount, deduction amount, co-insurance amount and patient amount in the claim summary are set to no error. If the equation is not satisfied, then algorithm 150 checks whether flags are set for the payment amount, allowed amount, deduction amount, co-insurance amount and payment amount. If no flags are found, then flags are set for payment amount, allowed amount, deduction amount, co-insurance and patient payment in the claim summary line, denoting these amounts as suspect. If flags are found, then algorithm 152 determines if only one field is set to suspect. If only one field is suspect, then it is computed and updated using the equation in algorithm 148. However, the flag is left alone.

An algorithm 154 determines whether the procedures billed amounts in a claim group add up to the claim summary billed amount. If the relationship is satisfied, then flags are reset as no error for all procedure billed amounts. If the relationship is not satisfied, then an algorithm 156 checks for any flags in the procedure billed amount field of the claim group. If there are no flags, then all the billed amounts in the claim group and the claim summary billed amount are flagged as suspect. If there are flags in the procedures billed amount field in the claim group, then algorithm 158 determines whether there is only one procedure billed amount flagged as suspect. If there is only one amount set to suspect, then a value is computed and substituted for the suspect amount, but leaving the flag set to suspect. The relationship in algorithm 154 is used to compute the value.

Algorithms 154, 156 and 158 are then repeated for the allowed amounts column.

An algorithm 160 then determines whether the claim summary allowed amount was changed by the previous sequence. If it has been changed, then the algorithm 92 is entered again at the very beginning of algorithm 92. Otherwise, the algorithm is exited.

FIG. 9

After the automated reconstruction process, each item in the original document R has been corrected as best as the algorithm can identify. There will be some converted and re-constructed items which may be correct, but about which the algorithms cannot be certain. These items are all flagged as suspect and passed to the interactive editor program module 62 which interacts with an operator, jumping from one suspected and highlighted data to the next after having the operator correct or verify the suspected data. While the interactive editing is proceeding, the reconstruction module 60 is also running in the background, so that, for example, if the operator corrects one suspected item, the reconstruction module may automatically further resolve several other suspect items. The final result of the interactive editor is to quickly identify and correct or verify the suspected data and generate a final "standard" claim summary data file. The data file generated will be a generalized file which will be the same regardless of which specific document or reconstruction module was used to interpret and correct the scanning errors. The standardization of the output data is necessary to efficiently administer the posting process to the provider's medical system.

The interactive editor 62 will now be discussed in detail.

Step 162 automatically highlights the first suspect data which then confirmed or is given a new value in step 64 by an operator. After the flagged data is confirmed or corrected, then the algorithm 92 is performed in step 166 for the current claim group to automatically correct other flagged data if possible. Steps 162, 164 and 166 are performed until there are no flagged data to confirm or correct. At that point, all the data are saved, ready to be posted to the provider's medical system.

Figure 10B:
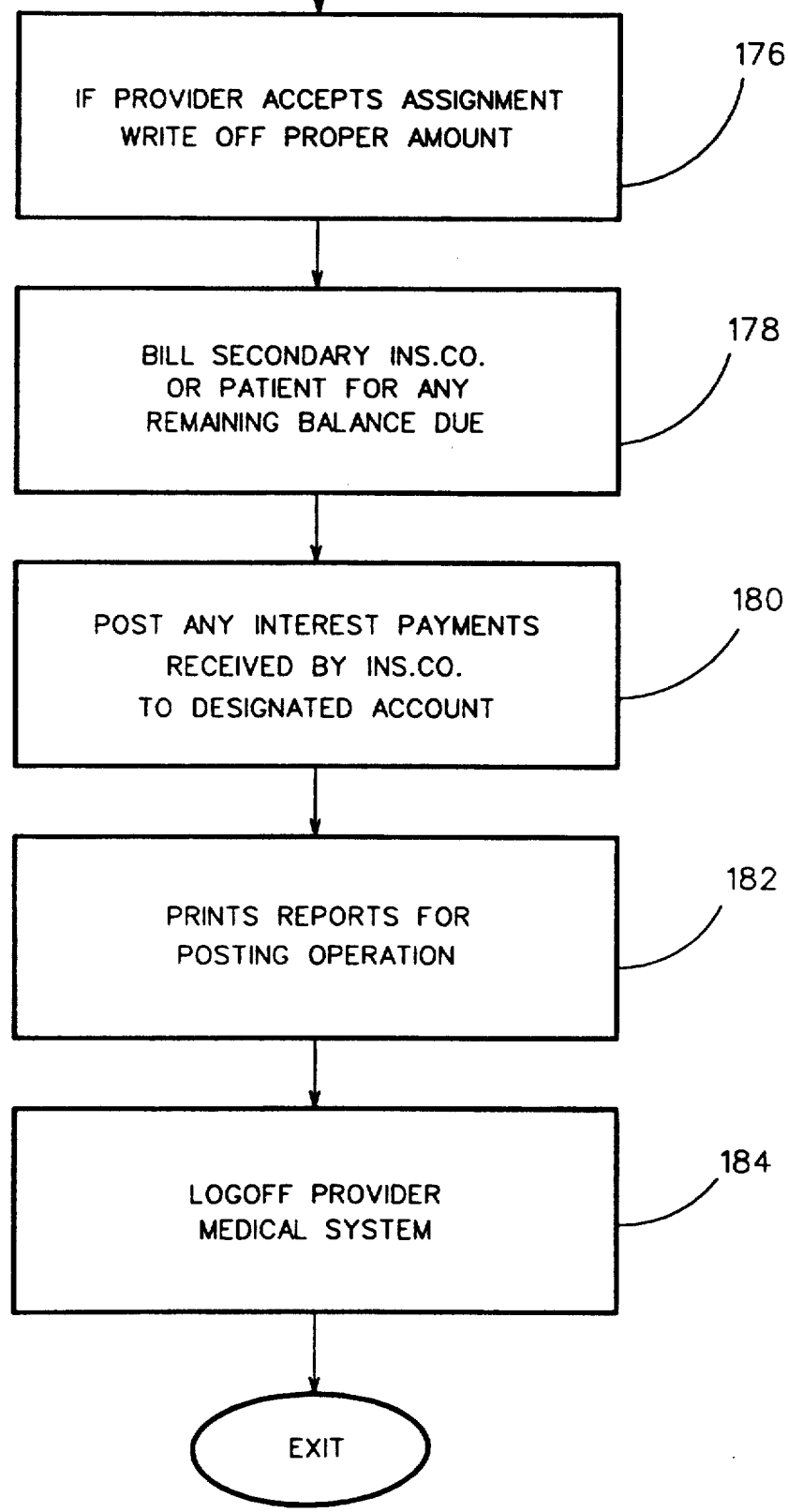

FIGS. 10a and 10b

The algorithm 64 for automatically posting the scanned document R to the provider's medical system will now be described.

After all the flagged data have been corrected or confirmed by the interactive editor, the computer system 40 automatically logs into the medical system in step 168 through the modem 52 or through a local or remote data link. The algorithm 64 gathers the account numbers of the patients covered in the claim through the provider's medical system entry screen in step 170. The received claim is then posted against matching billed claim in step 172. The procedures billed under the provider's claim are recalled and matched against the claims received by the insurance company, and a list is maintained of procedures charged by the insurance company in step 174. If the provider accepts an assignment, the proper amount is written off in step 176. For any remaining balance, a secondary insurance company or the patient is billed in step 178. Any interest payments received are posted to the designated account numbers in step 180. A report is then generated in step 182 indicating the accounts that were affected by the posting operation and any amounts that cannot be posted for various reasons, such as payment having been sent to the wrong provider, etc. Finally, the algorithm 64 logs off from the provider's medical system at the conclusion of the posting operation in step 184.

The posting module is an automated step which posts the received claims to the provider's medical system that is being used by the medical office or institution. The posting module is specific to the format layout of the reconstructed data file and the entry screens of the particular medical system that are being used. This module can be changed to another module which will specific to another medical system without having to change any of the preceding steps. This allows the present invention to equally apply to any insurance company claims or to any medical system.

The posting program module simulates an operator who enters the data manually to the medical system through an entry screen provided by the medical system. As far as the medical system is concerned, it thinks that an operator is entering the data.

The posting module has the added advantage of not having to know any intimate details of how the medical system handles or processes any information that needs to be posted. It merely needs to understand the screen entry format of the medical system. In this manner, the medical system is not even aware that the claim is being received by an automated posting method and therefore does not have to have special software to accommodate it. Because all data posted is entered automatically through the medical system data entry screens, all additional and normal processing of that data by the medical system, such as updates to day sheets, is automatically performed. As far as the medical system is aware, the posting is being performed manually by a typist. Since all data is entered through the medical systems entry screens, all previously setup security measures of the medical systems will remain intact.

The present invention effectively and efficiently replaces the person who would normally manually post the returned claim to the provider's medical system. A person skilled in the art will understand that any manual posting or inputting of data from a document with machine generated text to a system can be performed accurately and efficiently by the present invention.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A method for inputting into a computerized data base system data disposed in a desired format stored in the data base system and comprising test, the method comprising the steps of:
   (a) providing a document of desired format;
   (b) optically scanning the document and converting information thereon into computer readable characters and inputting the computer readable characters to a computer;
   (c) automatically determining which, if any, converted information does not correspond to the desired format and reconstructing within the computer into which the optically scanned document has been input by reference to the desired format or other converted information, converted information which does not conform to the desired format;
   (d) automatically flagging converted information which does not conform to the desired format and which cannot be reconstructed;
   (e) manually correcting the flagged information; and
   (f) transferring the converted, reconstructed and corrected document into a computerized data base system.

2. A method as in claim 1, and including the step of:
   (a) utilizing ASCII code for the computer readable characters.

3. A method as in claim 1, and including the steps of:
   (a) parsing the converted information into a number of data fields; and
   (b) determining whether each field corresponds to a respective format model.

4. A method as in claim 1, including the steps of:
   (a) providing a document having numerical data as the information;
   (b) establishing a mathematical model for the numerical data; and
   (c) determining whether the numerical data satisfies the mathematical model.

5. The method as in claim 1, including the steps of:
   (a) providing a document having as the information a person's name; and
   (b) determining whether the name is in proper format.

6. A method as in claim 1, including the steps of:
   (a) providing a document having as the information a person's identification number; and
   (b) determining whether the identification number is in a proper format.

7. A method as in claim 1, including the steps of:
   (a) providing a document having as the information a currency figure; and
   (b) determining whether the currency figure is in a proper format.

8. A method as in claim 1, and including the step of:
   (a) repeating the determining and reconstructing step after the flagged information has been corrected.

9. A method as in claim 1, and including the steps of:
   (a) separating the converted information into at least two data fields;
   (b) comparing the converted information of each data field to a desired format; and
   (c) flagging data which does not conform to the desired format.

10. A method as in claim 1, including the steps of:
    (a) providing a document having as the information data disposed in a plurality of rows and columns;
    (b) separating each row of data into fields;
    (c) checking each field against a desired format; and
    (d) flagging each field that does not conform to the desired format.

11. A method as in claim 1, including the steps of:
    (a) providing a document having as the information numerical data disposed in a plurality of rows and columns;
    (b) establishing a mathematical relationship for the numerical data of each row and each column;
    (c) comparing the data for each column and row and determining whether the data satisfies the mathematical relationship for the row and for the column; and
    (d) flagging all data for a row or a column that does not satisfy the associated mathematical relationship.

12. A method for automatically posting data to a provider's medical system, the data being contained on at least a page of a returned medical insurance claim, each page having data disposed in a known format, the method comprising the steps of:
    (a) providing a returned medical insurance claim of desired format having information thereon;
    (b) optically scanning each page of the returned medical insurance claim and converting the information into computer readable text which is then input into a computer;
    (c) automatically determining within the computer which text does not correspond to the desired format and reconstructing within the computer by reference to the desired format or the converted information the converted text that does not conform to the desired format;
    (d) flagging converted test that does not conform to the desired format and which cannot be reconstructed and requesting correction and confirmation thereof;
    (e) manually correcting flagged text which is not confirmed;
    (f) repeating the determining and reconstructing step to thereby correct or confirm all other flagged text; and
    (g) automatically posting the converted, reconstructed and corrected returned medical insurance claim to a provider's computer system.

13. A method as in claim 12, and including the step of:
    (a) manually confirming the accuracy of each flagged text or supplying new information in place thereof.

14. A method as in claim 12, and including the steps of:
    a) parsing the returned medical insurance claim into a number of data fields; and
    b) checking each field against a respective format model.

15. A method as in claim 12, including the steps of:
    (a) providing a returned medical insurance claim having numerical data as the information;

(b) establishing a mathematical model for the numerical data; and (c) determining whether the numerical data satisfies the mathematical model.

16. A method as in claim 12, including the steps of:

(a) providing a returned medical insurance claim having a person's name as the information; and (b) determining whether the name is in proper format.

17. A method as in claim 12, including the steps of:

(a) providing a returned medical insurance claim having a person's identification number as the information; and (b) determining whether the identification number is in proper format.

18. A method as in claim 12, including the steps of:

(a) providing a returned medical insurance claim having a currency figure as the information; and (b) determining whether the currency figure is in proper format.

19. A method as in claim 12, and including the steps of:

(a) separating the computer readable text into at least two data fields;

(b) comparing the computer readable text of each data field to a desired format; and (c) flagging data which does not conform to the desired format.

20. A method as in claim 12, including the steps of:

(a) providing a returned medical insurance claim having as the information data disposed in a plurality of rows and columns;

(b) separating the rows of data into a plurality of fields;

(c) checking each field against a desired format; and (d) flagging each field that does not conform to the desired format.

21. A method as in claim 12, including the steps of:

(a) providing the returned medical insurance claim having as the information numerical data disposed in a plurality of rows and columns;

(b) establishing a mathematical relationship between the numerical data for each row and for each column;

(c) checking whether the data for each column and row satisfies the associated mathematical relationship for the associated row and column; and (d) flagging all data of a row or column that does not satisfy the associated mathematical relationship.

22. A method for inputting data disposed in a plurality of rows and columns of known format on a document having machine generated text into a computer system, the method comprising the steps of:

(a) scanning the document text and thereby converting the text into computer readable characters and inputting the computer readable characters into a computer;

(b) automatically reconstructing by reference to a desired format or other computer readable characters within the computer converted text that does not conform to a desired format;

(c) automatically flagging within the computer converted text that does not conform to the desired format;

(d) interactively correcting the flagged text; and (e) automatically transferring the corrected text into another computer system.

23. A method as in claim 22, including the steps of:

(a) providing a document having text in rows of data;

(b) separating each row of data into a number of groups;

(c) separating each group of data of each row into a number of fields of data;

(d) verifying and checking each field of data; and (e) flagging each field of data that does not correspond to a desired format.

24. A method as in claim 23, and including the steps of:

a) manually confirming or supplying new data to each flagged data.

25. A method as in claim 24, and including the step of:

(a) determining whether correction of flagged data causes a corresponding correction to other flagged data and causing the other flagged data to be corrected in response thereto.

26. A method as in claim 22, and including the step of:

a) scanning the document with an electronic scanner.

27. A method as in claim 22, and including the step of:

(a) utilizing ASCII code for the computer readable characters.

28. A method for computer processing documents, comprising the steps of:

(a) providing a document having information thereon;

(b) optically scanning the document and converting the information into computer usable text;

(c) inputting the computer usable text into a computer;

(d) comparing within the computer the computer usable text with a predetermined format and determining which, if any, of the computer usable text does not correspond to the predetermined format; and (e) requesting correction or confirmation of the accuracy of the computer usable text determined not to correspond to the predetermined format.

29. The method of claim 28, including the step of:

(a) posting the computer usable text to a data base after data determined not to correspond to the predetermined format has been corrected or confirmed.

30. A system for inputting into a computer data from a document having a known format and having machine generated text, comprising:

(a) a computer system;

(b) means for optically scanning the document and converting the document text into computer readable characters so that the converted text may be input into the said system;

(c) first program means within said system for automatically reconstructing converted text that does not conform to a predetermined format stored in said system;

(d) second program means within said system for permitting converted text that does not conform to the predetermined format to be manually corrected; and (e) third program means within said system for automatically posting the correct text to another computer system.

* * * * *